(12) United States Patent
Tyler et al.

(10) Patent No.: X4446
(45) Date of Patent: May 23, 1826

(54) HATS, PRESSING LEGHORN, &C

(76) Inventors: Rufus Tyler; Benton P. Coston

Rufus Tyler & Benton P. Coston

The Schedule referred to in these Letters Patent and making part of the same containing a description in the words of the said Rufus Tyler and Benton P. Coston themselves of their improvement in pressing Leghorn Straw, and other Hats. )

The machine for pressing Leghorn, Straw, and other Hats, consists of a Stand of convenient height and form, on the top of which is a lever having its fulcrum in a swivel, passing through the top of the Stand. Near the fulcrum is a box or case (deeper than the breadth of the lever) the top of which is open, the bottom faced with steel, glass or other material, the case is for containing a block of iron which is heated (and imparts its heat to the bottom of the box or case) essential in the operation of pressing the hat. This block has a hole near the top, through which the bent end of a rod passes to lift it out of the case for the purpose of being heated. A Rod, one end of which serves to hold the hat block in a horizontal position passes through the front leg of the Stand having a crank at the other end, used in turning the hat block, and with it the hat, while the lever containing the case or box, is pressed down by the hand upon the side of the hat. The crown is pressed by slipping the hat block from the rod which turned it, and placing it on a bracket projected from the side of the Stand. The hat block is then turned by hand, while the lever is pressed upon it. The brim is pressed on the broad part of the top of the Stand.

Witnesses
J Badger
George Lee

Rufus Tyler
Benton P. Coston (350 words) (Patent 23rd May 1826) Exd [illegible]

DRAFTSMAN'S DIVISION.

*All communications should be addressed to*
"The Commissioner of Patents,
Washington, D. C."

2—328 a.

*DEPARTMENT OF THE INTERIOR,*

United States Patent Office,

*Washington, D. C.,* ..............................., *189*...

*SIR:*

*The printed* copies *of Patent No.* Tyler & Coston
are *exhausted.* May 23 1826

*As soon as printed a copy will be mailed you to complete your order.*

*By direction of the Commissioner:*

*Very respectfully,*

*Chief Clerk.*

8143b6-97-5m